United States Patent [19]

Fox

[11] 4,095,855

[45] Jun. 20, 1978

[54] GAS LUBRICATED SPINDLE BEARING ASSEMBLY

[75] Inventor: Wayne L. Fox, Castro Valley, Calif.

[73] Assignee: Fox International, Inc., Hayward, Calif.

[21] Appl. No.: 725,029

[22] Filed: Sep. 20, 1976

[51] Int. Cl.² .................................... F16C 32/06
[52] U.S. Cl. ............................ 308/9; 308/161; 308/DIG. 1; 403/371; 403/372
[58] Field of Search ............. 308/9, 28, 35, 161, 308/DIG. 1; 403/370, 371, 372

[56] References Cited

U.S. PATENT DOCUMENTS

| 1,337,742 | 4/1920 | Abbott, Jr. ........................ 308/9 |
| 1,758,182 | 5/1930 | Strong .............................. 403/370 |
| 2,297,506 | 9/1942 | Schmidt ......................... 403/372 X |
| 2,460,510 | 2/1949 | Laesser ............................ 403/372 |
| 2,888,878 | 6/1959 | Cobb .............................. 308/9 X |
| 3,113,809 | 12/1963 | Eggmann ........................ 308/28 X |
| 3,672,733 | 6/1972 | Arsenius et al. .................. 308/9 |
| 3,721,479 | 3/1973 | Rasnick et al. ................... 308/9 |

FOREIGN PATENT DOCUMENTS

| 955,800 | 4/1964 | United Kingdom .................... 308/9 |
| 1,143,960 | 2/1969 | United Kingdom .................... 308/9 |

Primary Examiner—George E. A. Halvosa
Attorney, Agent, or Firm—Boone, Schatzel, Hamrick & Knudsen

[57] ABSTRACT

A gas lubricated spindle bearing assembly comprising a stator assembly and a rotor assembly with a spindle engaged to the rotor and a twin parallel flexure engaged to one of said assemblies to establish and maintain an air spacing between the adjacent interfacing surfaces of the said stator and rotor assemblies.

3 Claims, 5 Drawing Figures

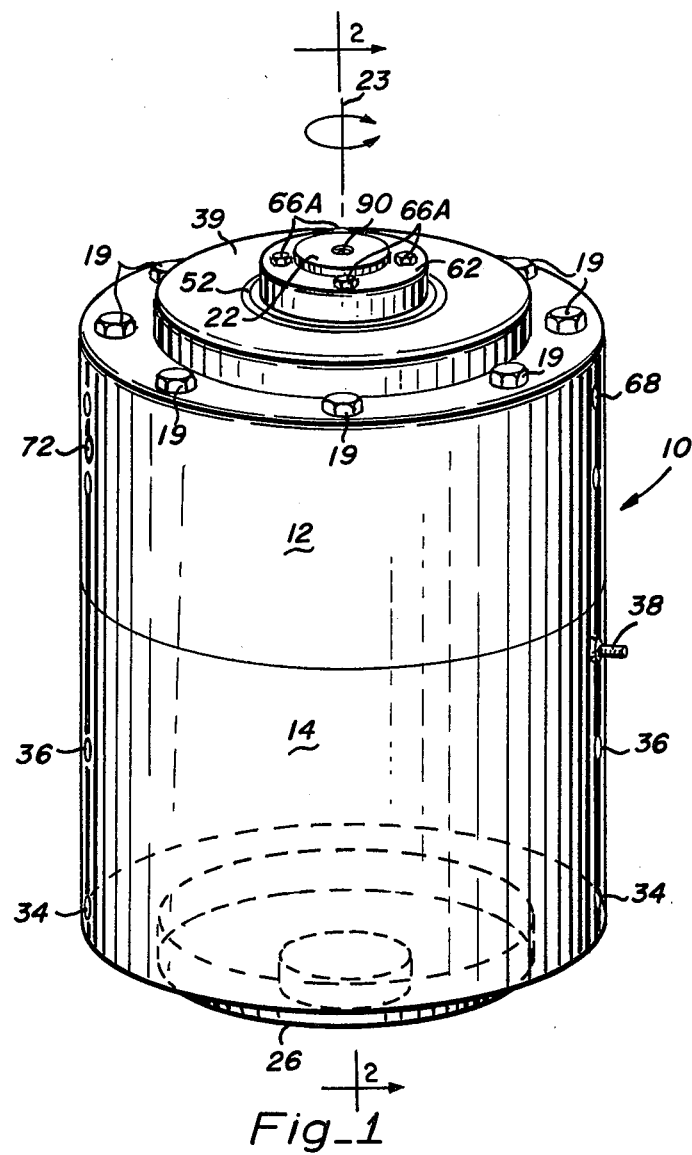
Fig_1

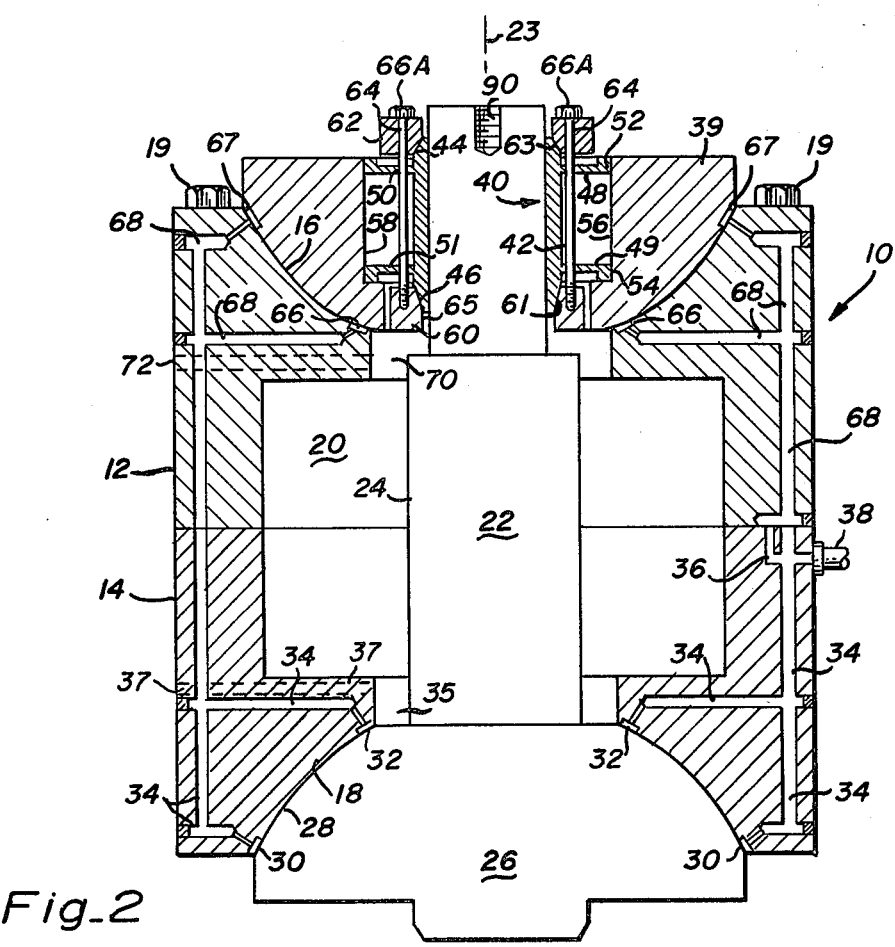
Fig_2
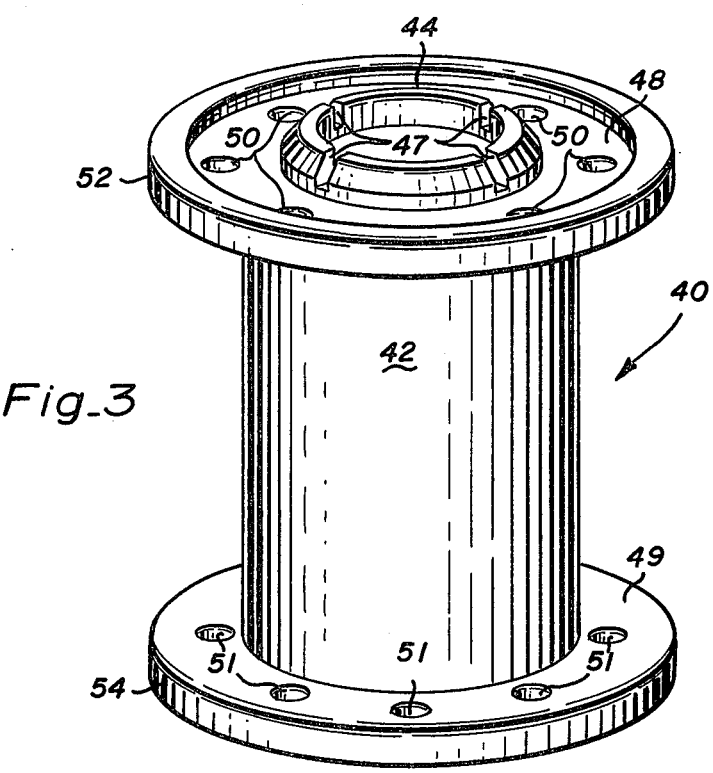
Fig_3

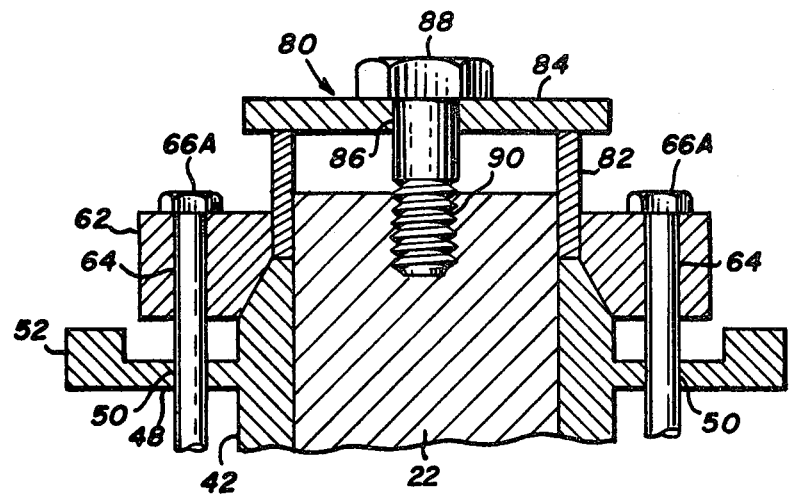
Fig_4
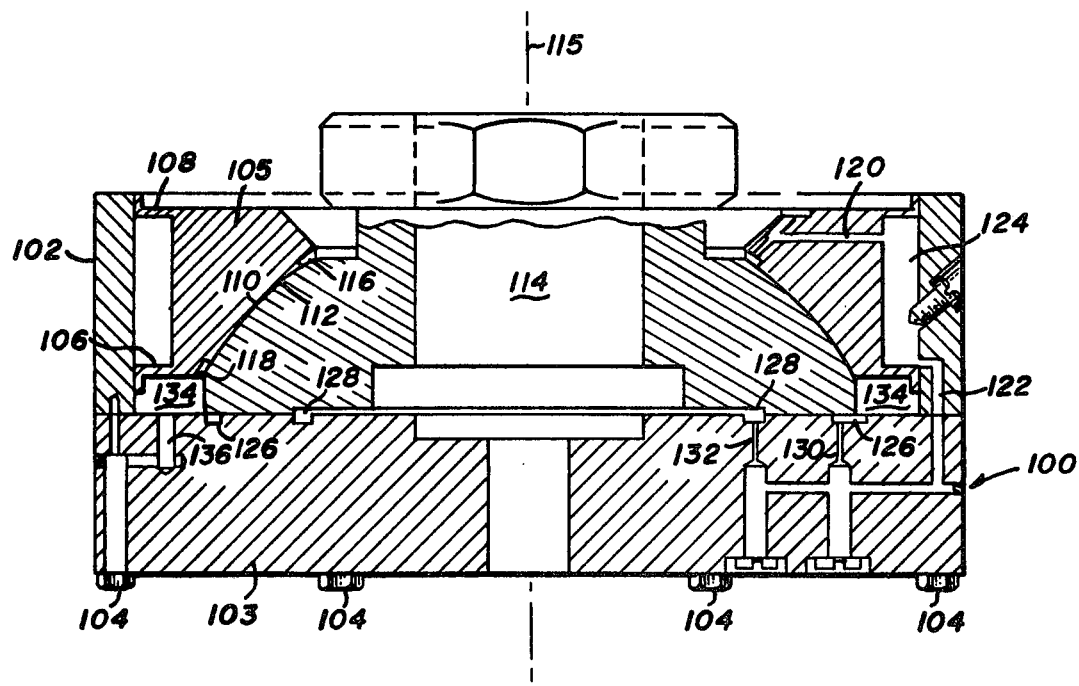
Fig_5

GAS LUBRICATED SPINDLE BEARING ASSEMBLY

BACKGROUND OF THE INVENTION

1. Field of the Invention

The present invention relates generally to gas bearings and, more particularly, to gas lubricated spindle bearings with stabilizing flexure assemblies.

2. Description of the Prior Art

Bearing assemblies are widely used for interfacing driving machines, e.g., motors with driven machines. There are various ball bearing, liquid lubricated and gas lubricated bearing assemblies in the prior art.

As the mechanical machinery technology becomes more and more sophisticated, more and more demands of accuracy and precision are placed on spindles interfacing rotating machinery. For example, computer disk pack transports, precision rotating instrumentation, precision rotating mirrors, machine tools and other rotating machinery demand continuous precise operation of the drive train and highly accurate spindle performance. Thus, high demands are placed on the bearing assemblies interfacing the stationary and rotary parts and there is a constant effort to improve bearing assemblies and spindle performance. There is a continuous search to develop bearing assemblies and spindles of increased accuracy and precision in the rotation of the spindle even under adverse atmospheric conditions; simplicity of construction, and requiring minimal amounts of lubricant.

SUMMARY OF THE PRESENT INVENTION

An object of the present invention is to provide an improved gas lubricated spindle bearing assembly.

Another object of the present invention is to provide a gas lubricated spindle bearing assembly requiring small amounts of gas lubricant.

Another object of the present invention is to provide a gas lubricated spindle bearing assembly which is highly accurate.

Still another object is to provide a gas lubricated spindle bearing assembly that operates on a minimal amount of clearance interface between the rotor and stator.

Another object is to provide a gas lubricated spindle that is highly accurate and relatively insensitive to thermal changes.

Briefly, a preferred embodiment of a gas lubricated spindle bearing assembly of the present invention includes a fixed stator assembly having a concave cup-shaped seat member and a rotor member with a convex spherical-shaped outer face seated within said cup member and coaxial therewith. A central opening is positioned within and coaxial with said rotor member. A spindle is engaged to the rotor by means of a twin-flexure collet member having a cylindrical bushing coaxial with and fitted about the spindle and a pair of flexible rings with a ring about each opposing end of the bushing and the edge surface of each ring engaging the inner wall of the cylindrical opening.

Among the advantages of the present invention are that it provides a compact and durable bearing spindle structure.

Another advantage is that it requires only a small amount of gas lubricant intermediate the rotor and stator members.

Another advantage is that it can operate on only a small degree of clearance between the rotor and stator members.

Another advantage is that it is relatively insensitive to thermal changes in the stator member or the rotor member thus allowing the positioning of a motor drive within the stator housing to drive the rotor member.

Other objects and advantages of the present invention will become apparent to those skilled in the art after having read the following detailed description of the preferred embodiments illustrated in the several figures of the drawing.

IN THE DRAWING

FIG. 1 is a perspective view of a gas lubricated spindle bearing assembly of the present invention;

FIG. 2 is a cross-sectional view of the spindle of FIG. 1 taken along the line 2—2;

FIG. 3 is a perspective view of the twin-flexure member of the spindle of FIG. 1;

FIG. 4 is a cross-sectional view of a pre-loading tool; and

FIG. 5 is a cross-sectional view of an alternative embodiment of the present invention.

DETAILED DESCRIPTION OF THE PREFERRED EMBODIMENTS

A gas lubricated spindle bearing assembly, referred to by the general reference character 10, and incorporating the present invention is illustrated in perspective in FIG. 1. The assembly 10 is illustrated in cross-section in FIG. 2, which is a view taken along the line 2—2 of FIG. 1. The assembly 10 comprises a stator housing assembly having an upper cylindrical stator housing section 12 and a lower cylindrical housing section 14. The upper stator housing section 12 forms a cup-shaped, concave-spherical seat 16. The lower stator housing section 14 forms a cup-shaped, concave-spherical seat 18. The upper and lower stator housing sections are secured in place relative to one another by a plurality of bolts 19 which extend through drilled holes in the upper section 12 and threaded in taps in the lower section 14. The housing sections 12 and 14 form an internal cavity 20 for receiving a motor (not shown) to drive a spindle 22 about its axis 23. The spindle 22 extends end-to-end of the stator assembly. The spindle 22 is unitary with a central portion 24 within the cavity 20 to allow for coupling to the motor. The spindle 22 is also unitary to a chuck 26 about the work end. The chuck 26 has a convex-spherical surface 28 interfacing with the concave seat 18. Chuck 26 is adapted to be coupled to a piece of equipment (not shown), e.g., a computer disk pack writer.

At the work end, the spacing between the convex surface 28 of the chuck 26 and the concave surface 18 establishes a gas bearing. The spacing communicates with a small groove 30 cut in the seat 18 about the outermost end of the seat 18 and with a small groove 32 cut in the seat 18 about the innermost end of the seat 18. The grooves 30 and 32 are radially discontinuous and provide an odd number of radial segments about the terminal ends of the seat 18. That is, if there are three segments of the groove 30, each groove segment is approximately 115° in radial length about the circumference with approximately 5° spacing intermediate each segment. Likewise, with the groove 32. If there are three segments, each groove segment is approximately 115° in radial length about the circumference with approximately 5° spacing intermediate each segment. The grooves 30 and 32 are, in practice, very shallow in depth. For example, in some embodiments the depth of the grooves is in the order of 0.015 inches. Gas is pumped through the grooves 30 and 32. The grooves 30 and 32 communicate with a series of orifices or capillaries 34 which receive lubricating gas from a manifold 36 engaged to a gas input portal 38. Intermediate the cavity 20 and the groove 32 is an exhaust channel 35 communicating with an exhaust vent 37 such that the lubricating gas may be vented to the exterior environmemt.

About the other terminal end of the spindle 22, referred to as the stabilizing end, is a convex spherical rotor section 39 of which the convex spherical faces the concave surface of the spherical seat 16. The rotor 39 is secured in place to the spindle 22 by means of a twin-flexure and double ended collet assembly referred to by the general reference character 40. The collet assembly 40 is further illustrated in FIG. 3 which is an enlarged, perspective view of the assembly. Collet 40 has a cylindrical bushing member 42 tapered about each terminal end to form tapered surfaces 44 and 46. A plurality of slits 47 are cut into the member 42 about the surface 44. Adjacent one terminal end of the bushing 42 and coaxial therewith is a planar, flexible disk 48 with an inverted L-shaped flange. About the other terminal end and coaxial therewith is a planar, flexible disk 49 with an L-shaped flange. The main planes of the disks 48 and 49 are normal to the axis 23. A set of holes 50 and 51 are placed in the disks 48 and 49, respectively.

As illustrated in FIG. 2, the bushing 42 is coaxial with the axis 23 and the internal cylindrical surface of the bushing 42 engages the exterior surface of the spindle 22. The disks 48 and 49 have outer peripheral surfaces 52 and 54, respectively, which are anchored in place to an internal wall surface 56 of a cavity 58 within the spherical-shaped rotor 39. A first collet closing sleeve 60 having a tapered interior edge surface 61 engages the tapered surface 46 of bushing member 42. A second collet closing sleeve 62 having a tapered interior edge surface 63 engages the tapered surface 44 of the bushing member 42. The collet sleeve 62 has a set of holes 64 and the sleeve 60 has a set of threaded taps 65 positioned to align axially with the holes 50 and 51 of the disks 48 and 49. A set of threaded bolts 66a are inserted in each set of holes 64, 50 and 51 and threaded in one of taps 65. Accordingly, as the bolts 66a are tightened, the collet closing sleeves 60 and 62 are drawn toward one another which in turn forces the tapered ends of the bushing 42 in pressure fit to the spindle 22. Thus, the collet sleeves 60 and 62 clamp the bushing 42 in place to the spindle 22. At the same time the outer edge surfaces 52 and 54 of the disks 48 and 49 are secured, e.g., by cement to the surface 56 to provide the interface engagement of the spindle 22 to the rotor 39. Thus, the rotor 39 is secured in place to the spindle 22 relative to the seat 16 by means of the twin-flexure and double ended collet 40. At the same time the flexibility in the disks 48 and 49 provide for flexibility and stabilization of the rotor 39 in the seat 16.

The spacing between the convex surface of the rotor 39 and the concave seat 16 establishes a gas bearing. The spacing communicates with a small groove 66 cut in the seat 16 about the innermost end of the seat 16 and with a small groove 67 cut in the seat 16 about the outermost end of the spacing.

Like the grooves 30 and 32 about the work end, the grooves 66 and 67 are discontinuous and provide for an odd number of radial segments with a bridge intermediate successive radial segments. If there are three radial segments of the groove 66, each groove segment is approximately 115° in radial length about the circumference with approximately 5° spacing intermediate each segment. These lengths are not critical. The primary consideration is to have an adequate bridge intermediate adjacent segments so as to prevent gas leakage therebetween. The grooves 66 and 67 are, in practice, very shallow in depth. For some embodiments, the depth of the grooves is in the order of 0.015 inches. Through the grooves 66 and 67, gas is pumped through a series of orifices or capillaries 68 from the manifold 36 engaged to the input portal 38. Intermediate the cavity 20 and the groove 64 is an exhaust channel 70 communicating with an exhaust vent 72 such that the lubricating gas may be vented to the exterior.

The gas groove segments 66 and 67 at the stabilizing end are such that if the rotor 39 tends to tip in any direction from the central axis 23, one or more of the channel segments 67 will be blocked off such that pressure will tend to build up within that channel segment and thereby cause the rotor 39 to right itself about the central axis 23. At the same time the chuck 26 at the work end responds to the orientation of the rotor 39.

In operation, gas is pumped from the manifold 36 through the channels 34 and 68 to the grooves 30, 32, 66 and 67. As the gas pressure is applied it tends to force the spherical rotor 39 away from the spherical seat surface 16 at the stabilizing end. Simultaneously, it tends to force the spherical chuck 26 away from the spherical seat 18 at the work end. These two forces oppose each other. Thus, the flexure disks 48 and 49, due to the opposing pressures, tend to flex such that there is a spacing between the surface 16 and the spherical surface of the rotor 39. At the same time there is established a spacing between the seat 18 and the surface 28 such that the rotor 39 and chuck 26 are freed up to rotate. Accordingly, the degree of flexure in the flexure disks 48 and 49 of the assembly 40 establish the spacing between the spherical convex and concave surfaces at the stabilizing and work ends of the spindle assembly 10. It may also be noted that if distortions come in due to the amount of pressure, i.e., due to heating, the degree of flexure in the flexure disks 48 and 49 will accommodate such and make adjustments. Thus, the degree of spacing between the rotor and the stator during operation remains the same notwithstanding the fact that there may be thermal changes.

The present design is designed to utilize a modest amount of gas lubriction. To operate it is merely necessary to apply sufficient gas pressure to free up the rotor from the spherical concave surfaces of the seats.

The present structure is such that it is not sensitive to thermal changes in the stator housing or spindle. This allows for placement of a motor drive within the housing cavity 20 intermediate the stabilizing and work ends. The flexure collet assembly 40 compensates for any thermal changes generated by the motor. However, the assembly also allows for an external motor in which case the cavity 20 would be omitted.

In assembling and adjusting the pressure intermediate the twin-flexure and dual ended collet assembly 40 it is desirable to have the resistance between the stator and rotor such that rotation is highly resisted in the absence of gas being applied, but freely rotatable when the gas is applied. In meeting this objective the stabilizing end is pre-loaded.

FIG. 4 illustrates application of a pre-loading tool 80 to the spindle 22 about the stabilizing end to pre-load the twin-flexure assembly 40. The assembly 80 comprises an annular ring 82 having an inner diameter equal to the inner diameter of the bushing 42. The ring 82 engages the top surface of the bushing 42 A flat circular disk 84 engages the top of the ring 82 to establish a platform with a coaxial aperture 86 therein. Protruding through the aperture 86 is a threaded bolt 88 which may be threaded into a threaded tap 90 in the end of the spindle 22.

In assembling the spindle 10 and setting the pre-load, assembly 80 is mounted to the spindle 22 as illustrated in FIG. 4. Initially gas of a predetermined pressure is applied to the input portal 38. Prior to application of the gas, no load is applied to the flexure collet assembly 40. Once gas is applied, the bolt 88 is tightened to urge the ring 82 and the bushing 42 downward. This in turn transmits pressure to the rotor 39. The bolt 88 is tightened until the spherical rotor 39 touches down on the seat surface 16. Then the bolts 66a are tightened to secure the collet closing sleeves 60 and 62. Next, the pre-load assembly 80 is removed from the end of the shaft 90 and the gas pressure is increased to the desired lift off of the rotor 39 and chuck 26.

FIG. 5 illustrates an alternative embodiment of an airbearing spindle incorporated in the present invention. FIG. 5 shows a turbine driven gas bearing spindle, referred to by the general reference character 100. The embodiment illustrates the gas bearing spindle as part of an optical scanner wherein a twelve-sided polygon, each with a mirror face is driven by the rotor. As known in the industry, such applications require a high degree of axial precision. The assembly 100 comprises an outer annular ring 102 bolted to a base 103 by means of a plurality of bolts 104. Engaged to the annular ring is a twin-flexure stator 105 having a pair of twin parallel flexure rings 106 and 108. The outer terminal ends of the rings 106 and 108 are cemented in place to the outer annular ring 102 to couple the stator 105 to the ring 102. The stator 105 forms a concave spherical-shaped surface 110 to receive a convex spherical shaped rotor 112. The rotor 112 is engaged to a central spindle 114 rotatable about an axis 115. About the terminal ends of the concave surface 110 are a pair of grooves 116 and 118. Like the grooves 30, 32, 66 and 67 the grooves 116 and 118 are segmented with a spacing intermediate adjacent segments. The air grooves 116 each communicate with an orifice or capillary 120 and each of the groove segments 118 communicates with an orifice or capillary 122 in turn engaged to a manifold 124. Also, the planar surface of the stator base 103 has a pair of annular grooves 126 and 128, which like grooves 30, 32, 66, 67, 116 and 118 are all segmented with a spacing intermediate adjacent segments. Each of the segments of the groove 126 communicates with an orifice or capillary 130 and each of the segments of the groove 128 communicates with an orifice or capillary 132. An exhaust channel 134 is formed intermediate the rotor 112, stator 103 and ring 102 to receive gas from the groove 118. An exhaust vent 136 extends from the channel 134 to the exterior. Exhaust from the grooves 116 pass directly to the exterior atmosphere. The grooves 128 exhaust about the shaft 114 and the grooves 126 exhaust to the channel 134.

In operation the air intermediate the interfacing surfaces of the stator 105 and the rotor 112 create a space to allow the rotor 112 to rotate about the twin flexure stator. Similarly, the air between the planar surface of the rotor 112 and the stator base 103 creates a space therebetween to allow the rotor 112 to rotate. Any deviation of the rotor 112 from the center axis 115 results in closure of one or more of the segments in the grooves 116, 118, 126 and 128 thus increasing the pressure and the rotor tends to be forced to the neutral position. Likewise, the twin flexures 106 and 108 flex to compensate for deviations in pressure due to thermal conditions. The position of stator 105 is thus responsive to the stresses in the twin-parallel flexure rings 106 and 108.

While this invention has been particularly shown and described with reference to preferred embodiments thereof, it will be understood by those skilled in the art that various changes in form and detail may be made therein without departing from the spirit and scope of the invention.

What is claimed is:

1. A gas lubricated spindle bearing comprising:
a first housing portion having a first end surface with a concave, spherically-shaped region forming a first seat means with a first plurality of circumferentially disposed air passage groove means formed thereon, a second end surface, a first bore extending between said first end surface and said second end surface, means forming a manifold for receiving a pressurized gas, and first gas channel means communicating between said first plurality of groove means and said manifold means;
a second housing portion having a third end surface with a concave spherically-shaped region forming a second seat means with a second plurality of circumferentially disposed air passage groove means formed thereon, a fourth end surface, a second bore extending between said third end surface and and said fourth surface, and second gas channel means communicating between said second plurality of groove means and said manifold means;
means fastening said first and said second housing portions so that said second surface abuts said fourth surface and said first and second bores are coaxial;
rotor means having a convex spherical surface of substantially the same curvature as said first seat means, said rotor means having a third bore formed therethrough and closely disposed to said first seat means so that said third bore is substantially coaxial with said first and said second bores;
chuck means having a convex spherical surface of substantially the same curvature as said second seat means and closely disposed to said second seat means;
spindle means having a first end and a second end and disposed through said first, second and third bores;
a twin, parallel flexure collet assembly including a first annular disk, a second annular disk facing said first annular disk and spaced axially apart therefrom, a cylindrical bushing having a first and a second end, means attaching said first disk coaxially around a portion of said cylindrical bushing proximate the first end of said bushing; and means attaching said second disk coaxially around a portion of said cylindrical bushing proximate the second end of said bushing;
means attaching the outer peripheral edges of said first and second disks to said rotor means; and a pair of collet closing sleeves engaged to opposing ends of said bushing and securing said bushing to said spindle;

said first and second annular disks being pre-loaded in a direction to bias said rotor means and said chuck means towards their respective seat means and where pressurized gas from said manifolds flow through said channels and out said grooves to separate said chuck means and said rotor means from their respective seats by a layer of lubricating gas.

2. A gas lubricated spindle bearing as recited in claim 1 wherein said housing is further provided with a cavity central thereto whereby a motor means may reside in said cavity and rotationally engage said spindle.

3. A gas lubricated spindle bearing as recited in claim 2 wherein said housing is substantially cylindrical.

* * * * *